United States Patent
Ohno (10) Patent No.: US 7,478,479 B2
(45) Date of Patent: Jan. 20, 2009

(54) MANUFACTURING PROCESS FOR A CROSS-ROLLER BEARING WITH PLUG

(75) Inventor: Kazuhiro Ohno, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 849 days.

(21) Appl. No.: 11/004,809

(22) Filed: Dec. 7, 2004

(65) Prior Publication Data

US 2005/0135720 A1 Jun. 23, 2005

(30) Foreign Application Priority Data

Dec. 19, 2003 (JP) .............................. 2003-421976

(51) Int. Cl.
  *B21D 53/10* (2006.01)
  *B21K 1/04* (2006.01)
(52) U.S. Cl. ............................ 29/898.051; 29/898.061; 29/898.062; 29/898.063; 29/898.064; 29/898; 384/559
(58) Field of Classification Search ............ 29/898.051, 29/898.061, 898.062, 898.063, 898.064; 384/559, 548, 560, 569, 570
  See application file for complete search history.

(56) References Cited

U.S. PATENT DOCUMENTS 3,275,391 A 9/1966 Blais
4,479,683 A * 10/1984 Kanamaru .................. 384/619
4,606,654 A * 8/1986 Yatsu et al. ................. 384/447
4,961,653 A * 10/1990 Suzuki et al. ............... 384/447
5,104,239 A * 4/1992 Sague ........................ 384/448
6,076,972 A * 6/2000 Yuasa et al. ................. 384/508

FOREIGN PATENT DOCUMENTS

JP 1-247818 10/1989
JP 3-37414 2/1991
JP 2002021868 A * 1/2002

* cited by examiner

*Primary Examiner*—David P Bryant
*Assistant Examiner*—Sarang Afzali
(74) *Attorney, Agent, or Firm*—Browdy and Neimark, P.L.L.C.

(57) ABSTRACT

A cross-roller bearing with plug, which has the high stiffness enough to allow the cross-roller bearing to turn with causing no jar or wobble, and also the production process to realize the cross-roller bearing with plug with ease and accuracy. With the cross-roller bearing with plug, more than one roller fills the space between the outside and inside races through a loading bore cut in any one of the races, and then a plug fits into the loading bore. The plug experiences cutting on its outside surface at the same time with the cutting of the circular outside surface of the outside race at once. The inside surface of the plug is also worked together with the cutting of the raceway surface around the inside circular surface of the outside race at a time.

5 Claims, 7 Drawing Sheets

MANUFACTURING PROCESS FOR A CROSS-ROLLER BEARING WITH PLUG

FIELD OF THE INVENTION

The present invention relates generally to roller bearings of the type hereinafter referred to as "cross-roller bearings" because of their construction where many cylindrical rollers are arranged in circular direction in such a way any two adjacent rollers are oppositely inclined with their own axes intersecting alternately one another, making it possible to carry both radial and thrust loads and, more particularly, to a cross-roller bearing with a plug to fit fixedly in any loading bore, which is provided in any one race of a ringlike track to put more than one roller in between inside and outside raceway surfaces at there, and further to a method of producing the same.

BACKGROUND OF THE INVENTION

An example of conventional cross-roller bearings is disclosed in, for instance Japanese Patent Laid-Open No. 1989-247818, which is of a type slim in thickness or height and includes more than one roller installed between an outside and inside races. The outside race is made therein with a cylindrical loading bore, which has an inside diameter somewhat larger than an outside diameter of the cylindrical roller but smaller than a diagonal dimension on an axial section of the roller, so that any roller dropped through the loading bore into a circular space between outside and inside raceway surfaces on the outside and inside races is allowed to fit snugly between the confronting raceway surfaces while rolling freely just after having made contact with any associated raceway surface. With the prior cross-roller bearing constructed slim in height as recited earlier, moreover, a cylindrical plug to close the loading bore is made such that the inside surface thereof is set back from the outside raceway surface to keep the plug against any engagement with the rollers after the plug has fit in the bore.

A swivel bearing with rolling-element loading plug is disclosed in Japanese Patent Laid-Open No. 1991-037414, which is of the sort of cross-roller bearing that is comprised of an outside race, inside race and more than one cylindrical roller interposed between the outside and inside races. A cylindrical loading bore is made in the inside race to insert the rollers into the space between the confronting races through there. A plug fits fixedly in the loading bore in such a way the inside end face thereof can merge smoothly with the inside raceway surface on the inside race. With the swivel bearing recited just above, the plug is made such that the inside end face thereof recedes somewhat from the raceway surface of the inside race after the plug has fit in the bore, while the raceway surface of the inside race is so made increasingly over any area before and after the loading bore as to make sure of smooth rolling of the cylindrical rollers across the plug.

Another type of prior roller bearings is disclosed in, for example U.S. Pat. No. 3,275,391, in which the circular space between an outside and inside races receives a plurality of cylindrical bearing rollers. A cylindrical loading plug fits in a corresponding bore, which is made in the outside race to insert the rollers into the space between the raceway surfaces through there. The cylindrical plug is fixedly secured in the associated bore with the radially outside end thereof sinking deep below the circular periphery of the outside race. The roller bearing is suited for use in a swivel bearing large in diameter, for example a matter of one meter in outside diameter, while the cylindrical plug is made apart from roller bearing to fit subsequently into the associated bore upon completion of assembly. The prior roller bearing constructed as recited just earlier is different than that in which the bearing fits entirely in any suitable housing, and also unlike the sort of the bearing construction in which the cylindrical plug is worked at the same time with internal working of the circular raceway in the race. The prior roller bearing constructed as recited just earlier does not fall in the sort where the rollers are under any prestressed condition.

The recently remarkable development in robotization technology in many industrial machines extensively requires any swiveling system using the cross-roller bearing that is high in stiffness to make to possible to turn smoothly without jarring even under high-speed revolution. To cope with the provision of high stiffness enough to allow the cross-roller bearing to turn with causing no jar or wobble, the prior art has heretofore developed many versions from making the clearance between any rolling element and its associated raceway surface as less as possible to applying high prestressed pressure to the rolling elements. Every prior version of the cross-roller bearings, nevertheless, requires several more chores including renewal of adjustment and working to serve both performances of high-speed turning with smoothness and high stiffness contributing to no jar or wobble.

SUMMARY OF THE INVENTION

The present invention has as its primary object to provide a cross-roller bearing with a plug that fits into a corresponding bore made in the ringlike track to insert more than one roller into between load-carrying surfaces in the ringlike track and, in particular to provide a cross-roller bearing in which a plug has a raceway surface made at the same time with a raceway surface in the ringlike track and also has an outside surface made at the same time with an outside circular surface around the ringlike track while the plug lies in the corresponding bore with the outside surface thereof being depressed below the outside circular surface around the ringlike track. The cross-roller bearing with the plug made as recited earlier according to the present invention, as opposed to the prior versions in which the plug finished apart from the roller bearing is applied directly to the corresponding bore, is highly effective to ensure the accuracy of processing performance in a much smoother manufacturing operation.

The present invention is concerned with a cross-roller bearing with plug; comprising a ringlike track composed of an outside race and an inside race fitting inside the outside race for rotation relatively to one another, the outside race having a circular raceway surface of V-shape in transverse section on an inside circular surface thereof, the inside race having a circular raceway surface of V-shape in transverse section on an outside circular surface thereof in opposition to the circular raceway surface around the outside race, more than one roller inserted through a loading bore, which is made in the ringlike track, into between the opposed raceway surfaces in a way any two adjacent rollers are oppositely inclined with their own axes intersecting alternately one another, the roller being made to have a diameter and an axial length that are approximately equal in ratio, and a plug fit into the loading bore in such a relation that an outside surface of the plug sinks below an external circular surface of the ringlike track while an inside surface of the plug lies in flush with the associated raceway surface on an internal circular surface of the ringlike track to form a raceway surface merging together with the associated raceway surface in the ringlike track.

In an aspect of the present invention, there is disclosed a cross-roller bearing with plug, in which the external circular surface of the ringlike track is any one of an outside circular surface of the outside race and an inside circular surface of the inside race, and the internal circular surface of the ringlike track is any one of the inside circular surface of the outside race and the outside circular surface of the inside race. According to a further another aspect of the present invention, the outside surface of the plug is worked simultaneously together with cutting of the external circular surface around the ringlike track, while the inside surface of the plug is worked at the same time with cutting of the internal circular surface of the ringlike track to form the raceway surface merging together with the associated raceway surface in the ringlike track.

In another aspect of the present invention, there is disclosed a cross-roller bearing with plug, in which the outside race fits around the outside surface thereof into a bore cut in any other machine housing while the inside race fits around the inside surface thereof over a journal of any shaft, and the rollers are interposed between the raceway surface of the outside race and the raceway surface of the inside race under any pre-stressed condition.

In another aspect of the present invention, there is disclosed a cross-roller bearing with plug, in which the loading bore cut in the ringlike track is made in way having an inside diameter larger than an outside diameter of the roller but smaller than a diagonal dimension on an axial section of the roller. According to a further another aspect of the present invention, there is a cross-roller bearing with plug, in which the plug fit into the loading bore is fixedly secured to the ringlike track by using a locking pin of straight pin.

In another aspect of the present invention, there is disclosed a cross-roller bearing with plug, in which the rollers are interposed between the confronting raceway surfaces of the outside and inside races in such a way any two adjacent rollers are oppositely inclined with their own axes intersecting alternately one another at right angle, and spaced away from each other with a separator. According to a further aspect of the present invention, the rollers fit in pockets made in a retainer, one to each pocket.

In another aspect of the present invention, there is disclosed a roller bearing with plug, in which the outside race is made with an oil groove extending around the outside circular surface thereof, which is open to the inside circular surface of the outside race through an oil passages, and the plug fit into the loading bore in the outside race is made with an oil groove lying substantially in line with the oil groove cut in the outside race.

The cross-roller bearing with the plug constructed as stated earlier has the high stiffness enough to be allowed to follow smoothly the high-speed revolution with causing no jar or wobble.

The present invention is moreover concerned with a production process for the cross-roller bearing with plug, comprising the steps of;

keeping a plug blank at a predetermined position in the loading bore cut in any one race blank for the ringlike track for introduction of more than one rolling element of roller, rough cutting both the plug blank and the race blank and then subjecting them to a hardening treatment;

moving the plug blank towards a biased position where an outside surface of the plug blank rises above an outside circular surface of the race blank, followed by working the outside surface of the plug blank together with the outside circular surface of the race blank at once into finished surfaces lying in flush with one another;

setting the plug blank back relatively to the race blank from the biased position to its initial position where the outside surface of the plug blank sinks below the outside circular surface of the race blank, followed by working an inside surface of the plug blank together with an inside surface of the race blank, thereby finish cutting any one race combined together with the plug to have a circular raceway surface of V-shape in transverse section extending over both of them;

combining other race of the ringlike track with the one race with no plug so as to fit the races into each other in a way the raceway surfaces on the races come into confronting one another, thereafter inserting more than one roller into a space between the confronting raceway surfaces through the loading bore; and then;

fitting the plug into the loading bore to secure fixedly the plug to the one race at the determined position.

In another aspect of the present invention, there is disclosed a production process for the cross-roller bearing with plug, in which the one race is the outside race while the other race is the inside race, or the one race is the inside race while the other race is the outside race. According to a further another aspect of the present invention, there is disclosed a production process for the cross-roller bearing with plug, in which the rough cutting is carried out to roughly cut axially opposite sides and the outside circular surface of the race blank, including for the outside surface of the plug blank, and further the rough cutting is done to roughly cut the inside circular surface of the race blank, including for the inside surface of the plug blank, to make the raceway surface of V-shape in transverse section and to cut a circular recess for cutting relief recess into the inside circular surface of the race blank, including for therein the inside surface of the plug blank.

In another aspect of the present invention, there is disclosed a production process for the cross-roller bearing with plug, in which the step of keeping the plug blank at the predetermined position in the loading bore cut in the one race blank is performed with using a locking pin of straight pin, and the step of moving the plug blank towards the biased position where the plug blank rises above the race blank is carried out with replacing the locking pin for a spring pin, which is in turn forced to get any deformation.

In another aspect of the present invention, there is disclosed a production process for the cross-roller bearing with plug, in which the step of setting the plug blank back from the biased position to its initial position where the outside surface of the plug blank sinks below the outside circular surface of the race blank is carried out by deforming again the already deformed spring pin to restore its initial straight shape to be drawn out of the both the plug blank and the race blank, and then applying a new locking pin instead of the spring pin.

The production process carried out by the steps as recited earlier helps make the cross-roller bearing with plug with accuracy and ease.

Other aspects, objects and advantages of the present invention can be obtained from a study of the drawings, the disclosure and the appended claims.

BEST MODE FOR CARRYING OUT THE INVENTION

The cross-roller bearing with the plug according to the present invention discussed later is adapted for extensive use in a relative turning system of a variety of machinery including industrial robots, machine tools, medical instruments, and so on, which requires slim construction, high stiffness and turning accuracy of the bearings.

A preferred first embodiment of the cross-roller bearing with the plug of the present invention will be explained in detail with reference to the accompanying drawings.

Figure 1:
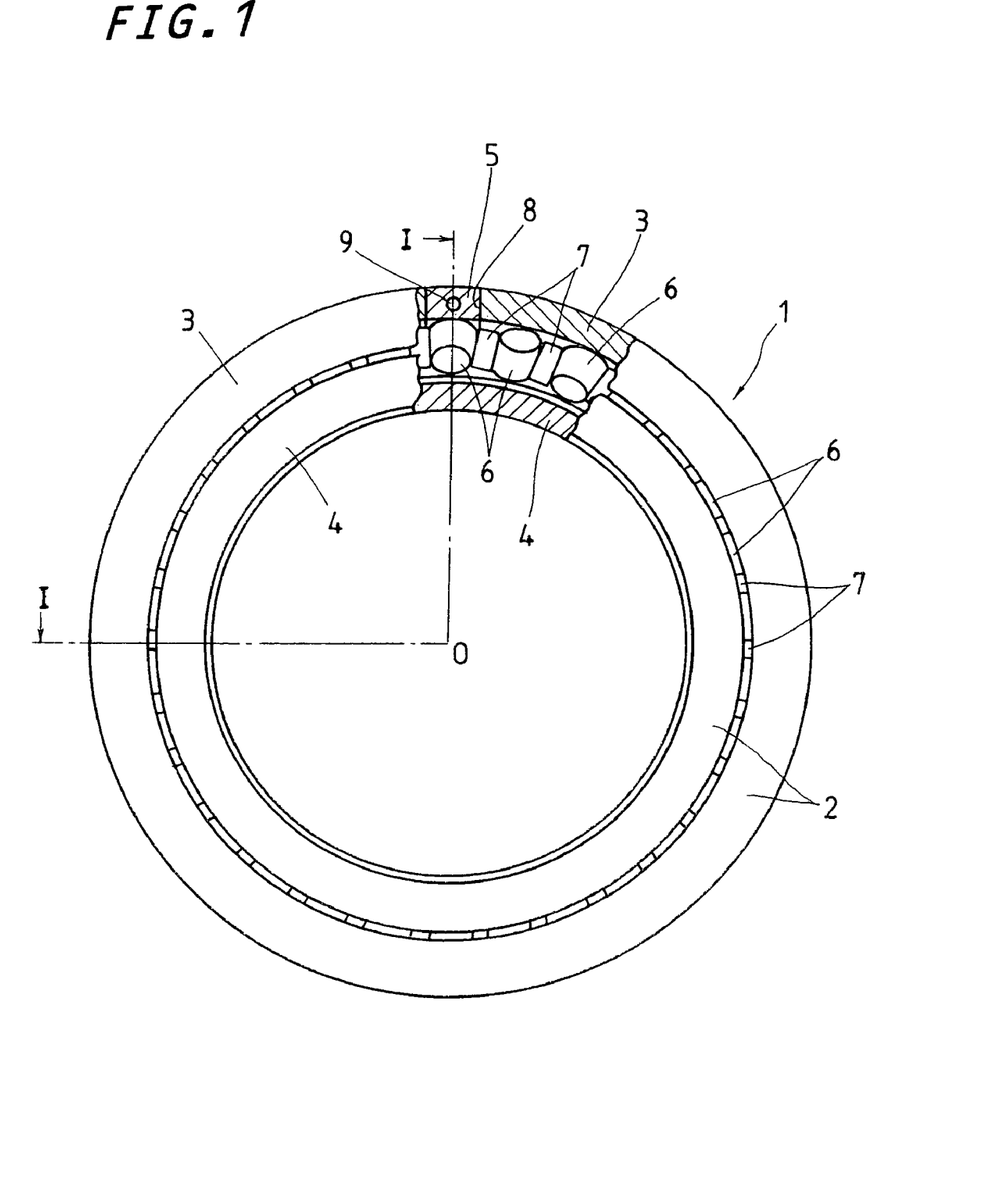
FIG. 1 is a partially cutaway view in front elevation of a preferred embodiment of a cross-roller bearing with a plug constructed according to the present invention.
Figure 2:
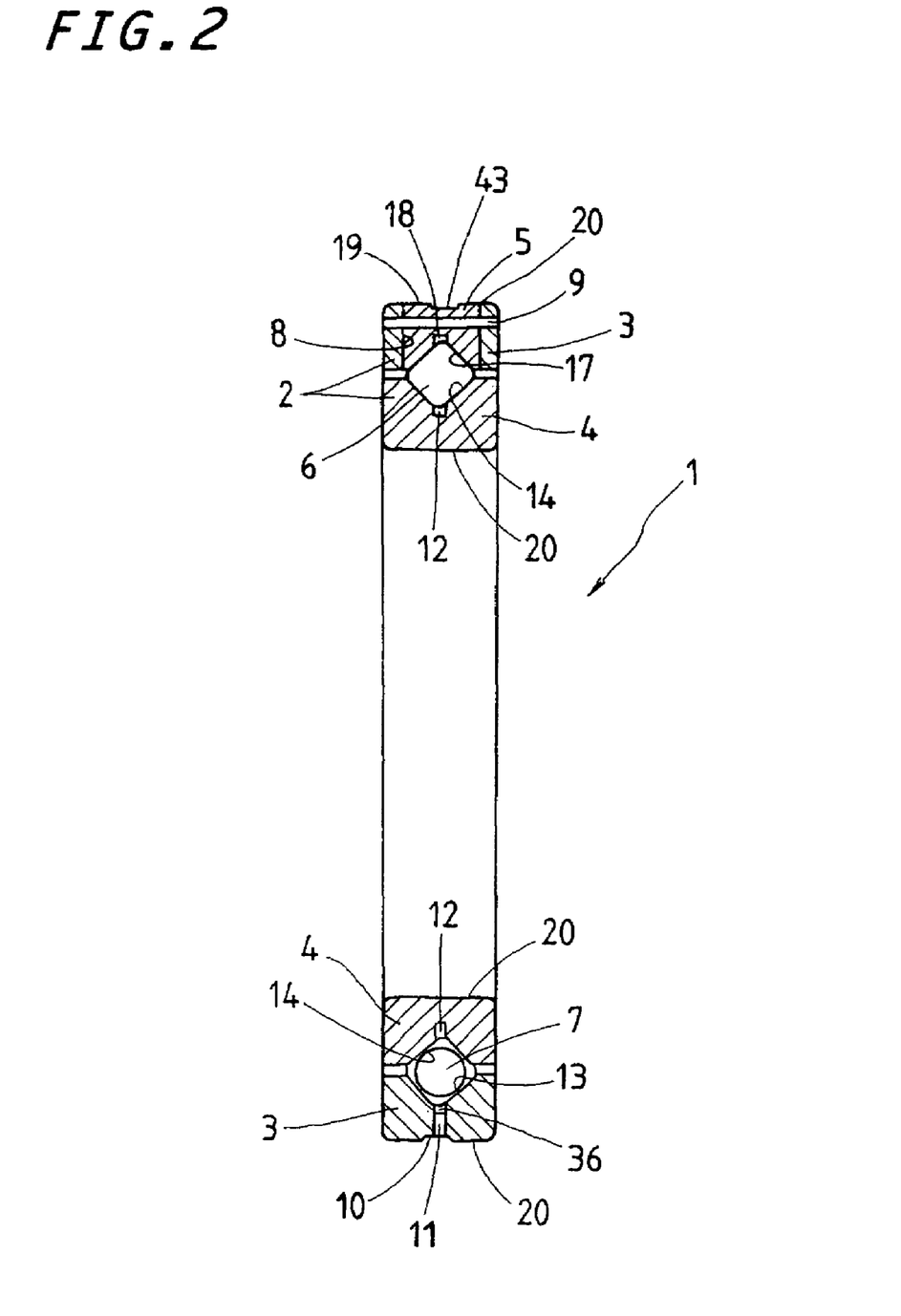
FIG. 2 is a transverse section of the cross-roller bearing with a plug of FIG. 1, taken on the plane lying on the lines I-O-I of FIG. 1.

With the first embodiment of the present invention shown in FIGS. 1 and 2, a larger or outside race 3 of a ringlike track 2 is made therein with a loading bore 8 that allows insertion of more than one roller 6 into a circular space in the ringlike track 2 through there. A plug 5 fits into the loading bore 8 for closure after completion of assembly of the rollers 6. A cross-roller bearing 1 is mainly comprised of the ringlike track 2 of the larger or outside race 3 and a smaller or inside race 4 fitting inside the outside race 3 for relative rotation one another, the outside race 3 being made on its inside circular surface with a raceway surface 13 of V-shape in transverse section, the inside race 4 being made on its outside circular surface with a raceway surface 14 of V-shape in transverse section in opposition to the raceway surface 13 of the outside race 3, a number of rollers 6 inserted through the loading bore 8 of the outside race 3 to fill the circular space between the confronting raceway surfaces 13, 14 in a way any two adjacent rollers 6 are oppositely inclined with their own axes intersecting alternately one another, and the plug 5 fitting in the loading bore 8.

In the cross-roller bearing 1 with the plug 5 explained herein, both the outside and inside races 3, 4 are referred to as the ringlike track 2 as a whole. Thus, radially outmost or inmost circular surface 20 around the ringlike track 2 corresponds with an outside circular surface 28 of the larger or outside race 3 or an inside circular surface 24 of the smaller or inside race 4, respectively, while an radially intermediate circular surface 22 in the ringlike track 2 represents an inside circular surface 25 of the larger or outside race 3 or an outside circular surface 26 of the smaller or inside race 4. With the cross-roller bearing 1 according to the present invention, the plug 5 fit into the loading bore 8 of the outside race 3 of the ringlike track 2 is fixedly secured there by means of a locking pin 9 of straight pin.

The cross-roller bearing 1 of the present invention features the plug 5 fit into the loading bore 8 made in any one of the outside and inside races 3, 4 of the ringlike track 2, and a process for producing the plug 5.

Figure 3:
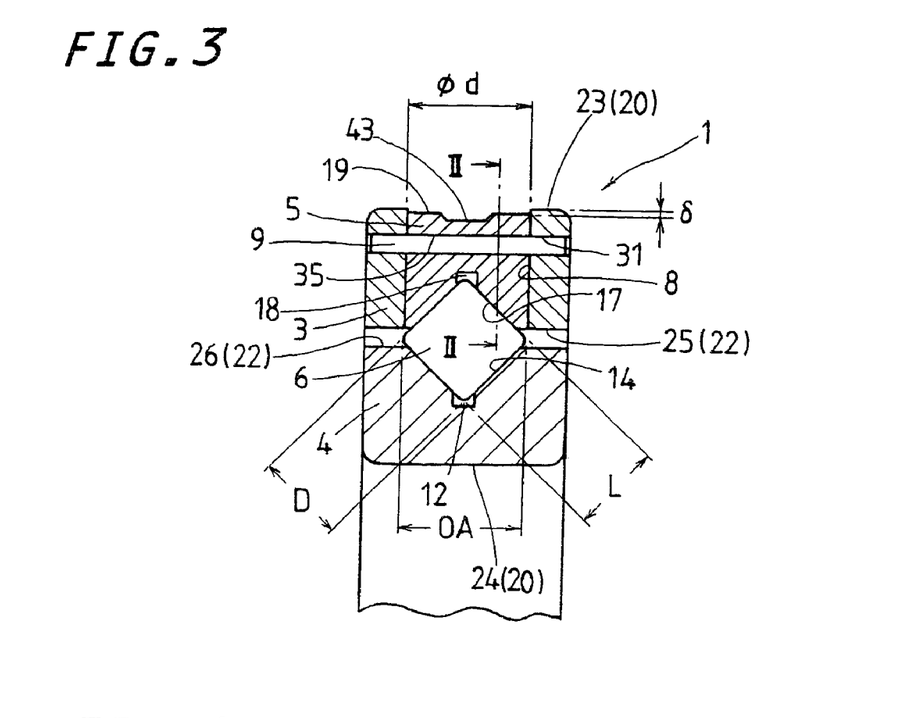
FIG. 3 is an enlarged fragmentary transverse section of the cross-roller bearing with the plug of FIG. 2, where the plug fits in an outside race.
Figure 4:
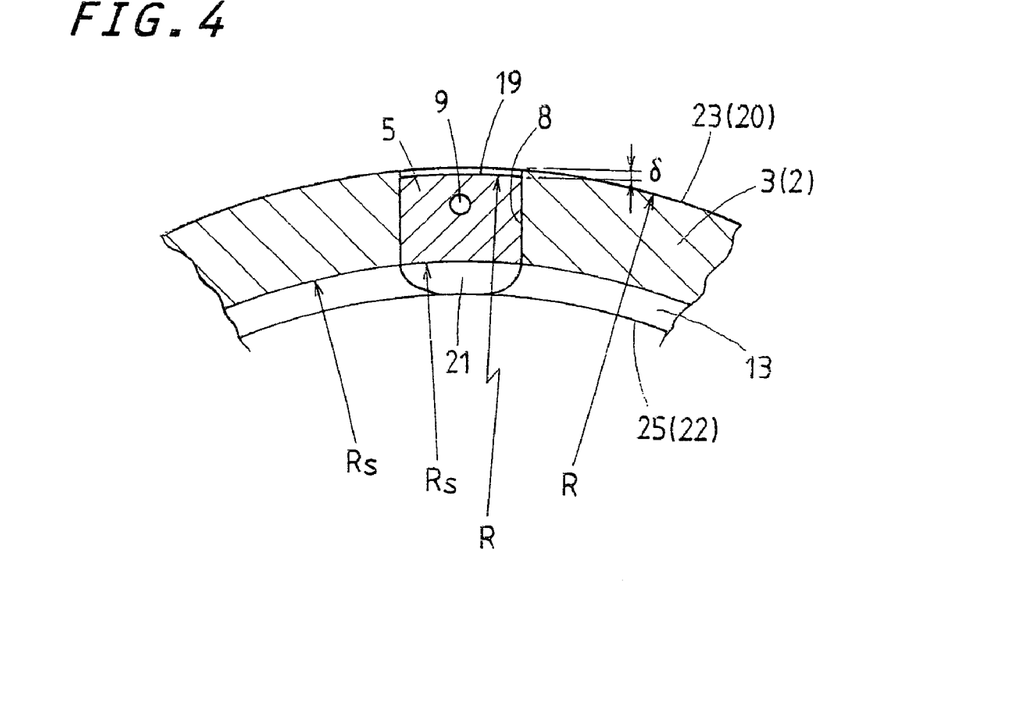
FIG. 4 is a fragmentary view of the outside race of the FIG. 3 in transverse section taken along the line II-II of the same figure.

With the cross-roller bearing 1 of the present invention, the plug 5 is made to be fit in the loading bore 8 of the outside race 3 as shown in FIGS. 3 and 4, where the plug 5 lies in the loading bore 8 in a way its outside surface 19 sinks deep below the outside circular surface 23 of the outside race 3 by a depression δ while its inside surface 21 forms an outer raceway surface 17 lying in flush with the raceway surface 13 on the outside race 3. The depression δ of the outside surface 19 of the plug 5 below the outside race 3, although selected depending on the dimension in size of the cross-roller bearing 1, may be made in for example from 10 μm to 50 μm and in certain circumstances made in about 0.1 mm. With the first embodiment, moreover, the loading bore 8 cut in the outside race 3 of the ringlike track 2 is made in way having an inside diameter φd larger than an outside diameter D of the roller 6 but smaller than a diagonal dimension OA on anaxial section of the roller 6.

Figure 6:
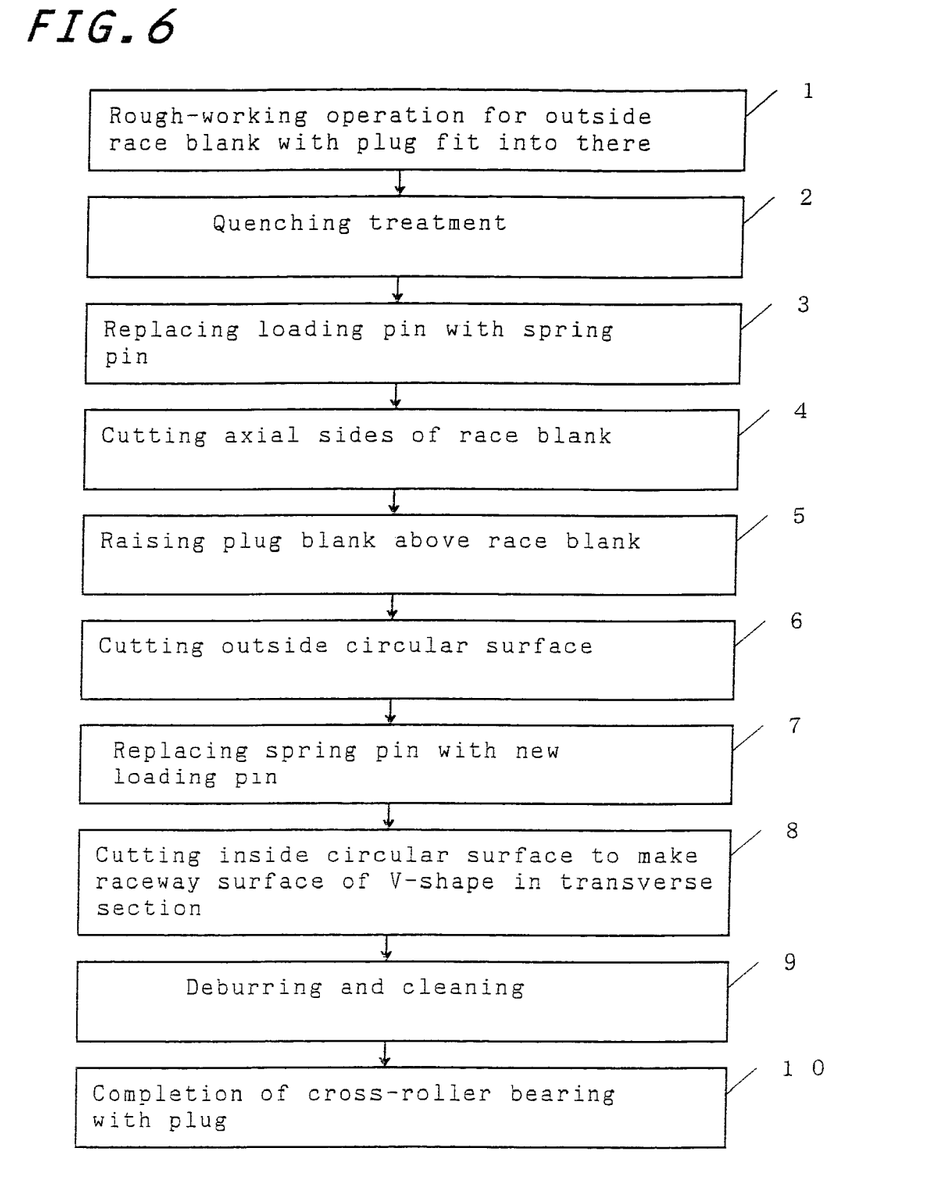
FIG. 6 is a flow diagram illustrating working procedures to make the cross-roller bearing with the plug constructed according to the present invention.
Figure 7:
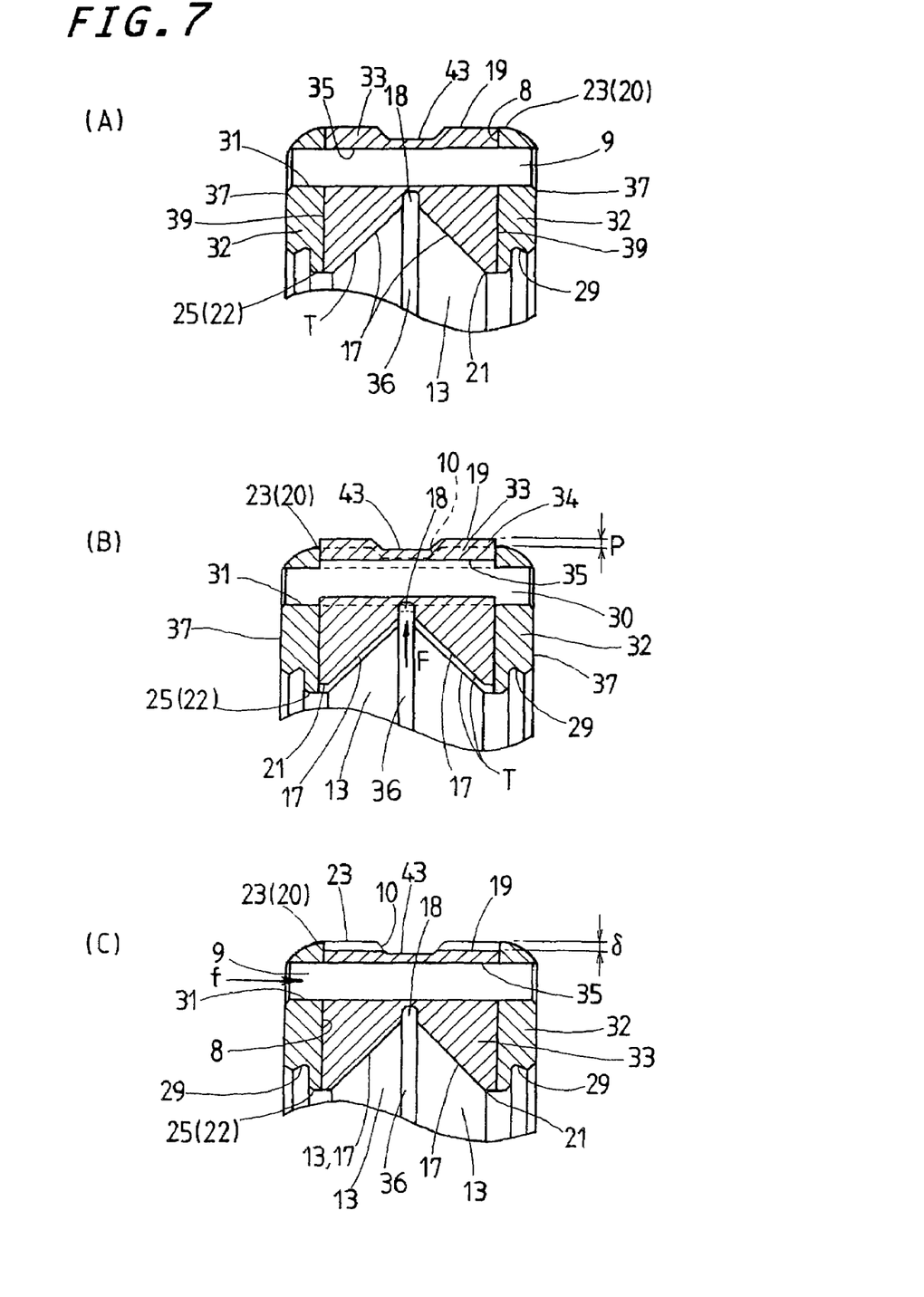
FIG. 7 is a fragmentary view in transverse section to illustrate how to make the cross-roller bearing with the plug of the present invention, in which (A) is a phase where a plug blank fits in an outside race blank, (B) is a phase where the plug blank rises radially above the outside race blank, and (C) is a phase after a spring pin has been replaced by a locking pin to keep the plug in position.

With the cross-roller bearing 1 in which the loading bore 8 is provided in the outside race 3, the plug 5 is, as seen in FIGS. 6 and 7, worked at its outside surface 19 by finish-cutting done at a time simultaneously with the cutting of the outmost circular surface 20 of the ringlike track 2 or the outside circular surface 20 of the outside race 3, while at its inside surface 21 by finish-cutting done at the same time with the cutting of the intermediate circular surface 20 of the ringlike track 2 or the raceway surface 13 of the outside race 3 to form the outer raceway surface 17 lying in flush with the raceway surface 13 on the outside race 3.

Figure 9:
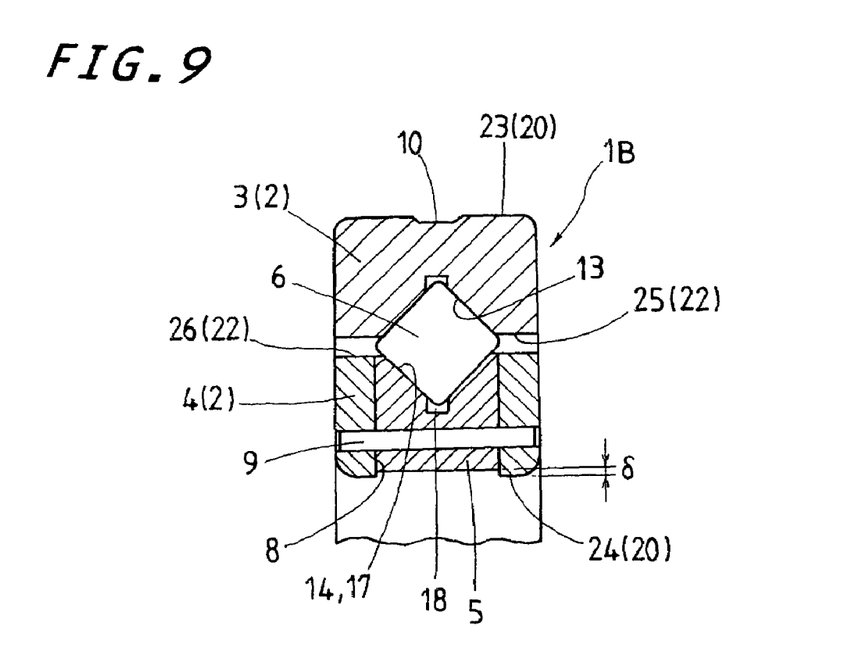
FIG. 9 is a fragmentary view in transverse section showing a third embodiment of the cross-roller bearing with the plug according to the present invention.

When the loading bore 8 is provided in the inside race 4, contrary to the above, the plug 5 is, as shown in FIG. 9, made at its outside surface 19 by finish-cutting done at the same time with the cutting of the inmost circular surface 20 of the ringlike track 2 or the inside circular surface 24 of the inside race 4, while at its inside surface 21 by finish-cutting done at a time simultaneously with the radially intermediate circular surface 22 in the ringlike track 2 or the raceway surface 14 of the inside race 4 to form an inside raceway surface 17 lying in flush with the raceway surface 14 on the inside race 4.

Moreover, the cylindrical rollers 6 are each made to have a diameter D and an axial length L with approximately a 1:1 ratio. More than one roller 6 disposed between the confronting raceway surfaces 13, 14 of the outside and inside races 3, 4 is a cylinder constructed to have the diameter D and the axial length L with approximately a 1:1 ratio. With the cross-roller bearing 1 shown in FIG. 1, many cylindrical rollers 6 fill the space between the raceway surfaces 13, 14 of the outside and inside races 3, 4 in such a way there is line contact between a roller 6 and the races 3, 4. The rollers 6 are arranged in circular direction in such a way any two adjacent rollers 6 are oppositely inclined with their own axes intersecting alternately one another and also spaced away from each other with a separator 7. According to the embodiment discussed now, any two adjacent rollers 6 are arranged in such a relation they are oppositely inclined with their own axes intersecting at right angle. The separator 7 interposed between any two adjoining rollers 6 is to keep them against coming into direct contact with one another, making sure of high-speed rotation adapted to follow any high-speed operation of the swiveling system.

The loading bore 8 in the outside race 3 is made at least one location around the circular surface thereof. The larger or outside race 3 is made with a circular oil groove 10 extending around the outside circular surface 23 thereof, which is open to the inside circular surface 25 of the outside race 3 through oil passages 11 to allow any lubricant flowing along the raceway surface 13, making for a very fast revolution of the bearing 1. The circular oil groove 10 extends the overall circumference of the outside circular surface 23 of the outside race 3, including for the outside surface 19 of the plug 5. The oil passages 11 are so made in the outside race 3 as extending radially at more than two locations.

The outside race 3 is made with axial holes 31 extending in alignment with one another through the axially opposed sides 37, 37 while the plug 5 is made with a hole 35 extending diametrically through a circular surface 39 of the plug 5. A locking pin 9 of straight pin serves to fixedly secure the plug 5 in place in the outside race 3 by passing right throughout both the hole 35 in the plug 5 and the holes 31 in the outside race 3. The plug 5 to fit into the loading bore 8 in the outside race 3 is also made with an oil groove 43, which is cut so as to come into substantially flush with the circular oil groove 10 around the outside race 3. Strictly speaking, the oil groove 43 on the plug 5 is made less in depth by the depression 6, compared with the circular oil groove 10 around the outside race 3.

Figure 5:
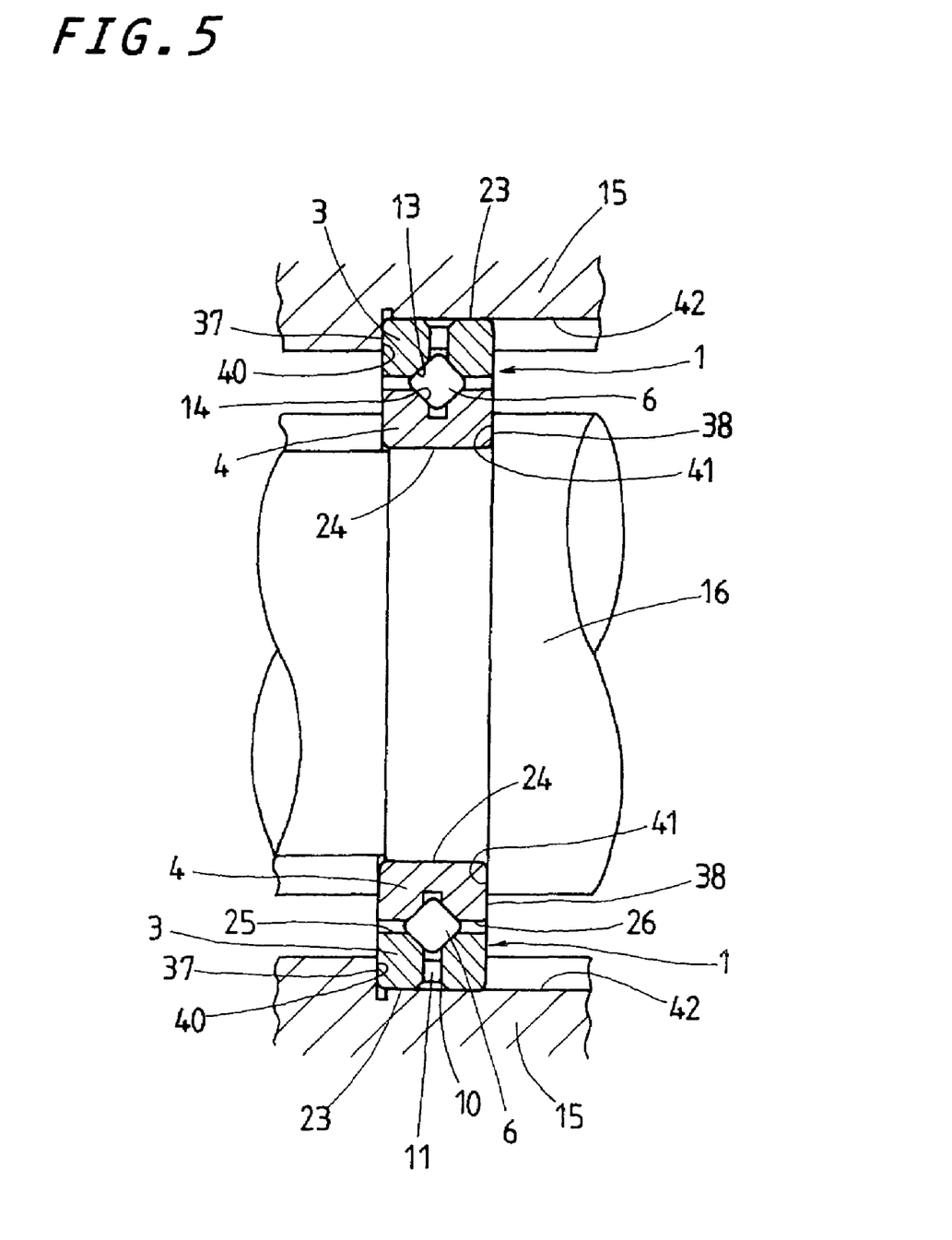
FIG. 5 is a fragmentary view in transverse section of the cross-roller bearing with the plug according to the present invention, which is illustrated in a way incorporated in any other machine component.

The present invention yields the cross-roller bearing 1 made thinner, more compact in construction where the rollers 6 are interposed between the raceway surface 13 of the outside race 3 and the raceway surface 14 of the inside race 4 under any prestressed condition. To make the most of beneficial performance of high stiffness, the cross-roller bearing 1 of the present invention is envisaged using it in such a way shown in FIG. 5 that the race 3 fits around the outside surface 23 thereof into a bore 42 cut in any other machine housing 15 while the inside race 4 fits around the inside surface 24 thereof over a journal 16 of any shaft, pipe, and so on. It is to be noted that both the outside and inside circular surfaces 23, 24 of the outside and inside races 3, 4 are finished accurately with less tolerance to assure a snug fit of the races 3, 4 with their associated mating surfaces. That is to say, the circular outside surface 23 of the outside race 3 and the circular inside surface 24 of the inside race 4 are accurately ground to a very fine finish. The axially opposed sides 37, 38 of the outside and inside races 3, 4 are also finished with accuracy like so much of the circular surfaces 23, 24 stated earlier. As illustrated in FIG. 5, the outside race 3 fits into the bore 42 inside the machine housing 15 in such a manner that any one of the axially opposed sides 37 on the outside race 3 comes into abutment against a surface of reference 40 provided on a shoulder inside the machine housing 15, while the inside race 4 fits over the journal 16 with any one of the axially opposed sides 38 on the inside race 4 coming into abutment against a surface of reference 41 provided on a shoulder around the journal 16.

How to produce the cross-roller bearing with the plug of the present invention will be explained below with reference to a preferred process embodiment shown in FIGS. 6 and 7. Although but the production process will be explained in a version in which the plug 5 fits into the outside race 3 of the ringlike track 2, it will be appreciated that another version the plug 5 fits into the inside race 4 as shown in FIG. 9 may be made by using the same production process.

The production process for the cross-roller bearing of the present invention starts with a step 1 where a plug blank 33 gets fit in place into the loading bore 8 cut into an outside race blank 32 as shown in FIG. 7(A) to experience subsequent procedures together with the outside race blank 32 preparatory to loading of rollers 6 to fill the space between the races.

Then, the plug blank 33 is subjected to quenching together with the outside race blank 32 at a step 2. The outside race blank 32 is made in advance with the loading bore 8, which extends radially of the outside race blank 32. On the axially opposed sides 37 of the outside race blank 32, there are made the axial holes 31 at areas corresponding with the loading bore 32. The plug blank 33 is made therein with the hole 35 extending diametrically through the circular surface 39 thereof in alignment with the axial holes 31 cut in the outside race blank 32. After the plug blank 33 has fit into the loading bore 8, the locking pin 9 of straight pin is introduced from any one of the sides 37 of the outside race blank 32 to pass right throughout both the hole 35 in the plug blank 33 and the holes 31 in the outside race blank 32 to secure the plug blank 33 to the outside race blank 32. Subsequently, turning operation on a lathe is carried out to roughly cut the axially opposite sides 37 and the outside circular surface 23 of the outside race blank 32, including for the outside surface 19 of the plug blank 33. Further, the internal turning operation is done on the lathe to make rough cutting of the raceway groove of V-shape in transverse section, or rough raceway surface T, and a circular recess 18 for cutting relief recess 36 into the inside circular surface 25 of the outside race blank 32, including for the inside surface 21 of the plug blank 33. A circular shoulder 29 to keep any sealing material therein, when needed, may be made using the internal turning operation along the inside circular surface 25 of the outside race blank 32. With the step 1 complete, the rough cut outside race blank 32 together with the rough cut plug blank 23 is then subjected to quenching operation at the step 2 for the purpose of producing a hardness on the raceway surfaces 13, 17 preparatory to finishing work, thus making sure of long-service life and stiffness of the raceway surfaces 13, 17 with helping smooth rolling of the rollers 6.

The production process goes on to further steps 3 to 6, in which after the plug blank 33 is set a radially biased situation where the outside surface 19 of the plug blank 33 is raised above the outside circular surface 23 of the outside race blank 32, the outside surface 19 of the plug blank 33 experiences a finish-cut operation simultaneously with the finish-cut of the outside circular surface 23 of the outside race blank 32. After withdrawal of the already existing locking pin 9 out of both the hole 35 in the plug blank 33 and the holes 31 in the outside race blank 32, a spring pin 30 instead of the locking pin 9 is forced at step 3 through both the hole 35 in the plug blank 33 and the holes 31 in the outside race blank 32. At step 4, the outside race blank 32 is finish cut at the axially opposing sides 37 thereof. Application of pressing force F to the plug blank 33 with any hammering or hydraulic press at step 5 causes the spring pin 30 to make plastic deformation where the outside surface 19 of the plug blank 33, as shown in FIG. 7(B), rises above the outside circular surface 23 of the outside race blank 32 by a raised amount P of, for example 30~40, μm. At step 6, the finish-turning operation is performed on the lathe to cut precisely the outside circular surface 23 of the outside race blank 32, including for the outside surface 19 of the plug blank 33 at a time.

Following the operations stated earlier, the production process for the cross-roller bearing with the plug constructed according to the present invention further needs to get the plug blank 33 back relatively to the outside race blank 32 from the radially biased situation to its initial situation where the outside surface 19 of the plug blank 33 sinks below the outside circular surface 23 of the outside race blank 32. At step 7, the spring pin 30 already deformed by plastic working is deformed again to restore its initial straight shape to be drawn out of the both the hole 35 in the plug blank 33 and the holes 31 in the outside race blank 32. Then, a new locking pin 9 of straight pin is inserted into the holes 31, 35 lying in line. In this phase, the spring pin 30 needs not be completely worked into its initial straight shape for the reason that the spring pin 30, as having an elastic property in itself, may be easily withdrawn out of the holes 31, 35 by simple application of an axial thrust force f to the spring pin 30, as shown in FIG. 7(C), with using any hammering or hydraulic press. After the new locking pin 9 has fit into the holes 31, 35, the plug blank 33 is held at its initial predetermined situation shown in FIG. 7(C), where the rough turning was previously performed on the lathe. In the situation shown in FIG. 7(C), the plug blank 33 lies in a way the finished outside surface of the plug blank 33 sinks below the finished outside circular surface 23 of the outside race blank 32 by a recessed amount δ of around 10~50 μm.

At step 8, the internal finish-turning is performed on the lathe to cut precisely the inside circular surface 25 of the outside race blank 32 together with cutting the inside surface 21 of the plug blank 33 to finish the raceway grooves 13, 17 of V-shape in transverse section at once, thereby providing the outside race 3 of the ringlike track 2 having the finished raceway groove 13 of V-shape in transverse section and also providing the plug 5 having the finished raceway groove 17 of V-shape in transverse section. The circular recess 18 for cutting relief recess 36 remains unfinished on the lathe. In other words, while the raceway surfaces around the inside circular surface 25 of the outside race blank 32 are internally finished, the inside surface 21 of the plug blank 33 is also finished simultaneously together with the inside circular surface 25 of the outside race blank 32 at a time to provide the raceway surface that lies in flush with the circular raceway surface 13 of the outside race blank 32. Thereafter, the locking pin 9 is withdrawn from the holes 31, 35 of the outside race 3 and the plug 5 to disassemble the plug 5 from the outside race 3, which are then subjected to any finishing procedure including deburring, cleaning, and so on at step 9.

As for the inside race 4, the inside race blank, after having been rough cut, is finished around the inside circular surface 24 thereof, while around the outside circular surface 26 thereof to made thereon with the raceway surfaces 14. There the inside race 4 of the ringlike track 2 is placed inside the outside race 3 of the ringlike track 2, making the raceway surface 14 of the inside race 4 opposed to the raceway surface 13 of the outside race 3. In this phase, the outside race 3 has been previously dismantled of the plug 5 preparatory to the loading of the rollers 6. Then, the rollers 6 are introduced through the loading bore 8 into a circular space between the raceway surfaces 13 and 14. On assembly of the cross-roller bearing 1 with the plug at step 10, the rollers 6 are inserted in the given circular space together with separators 7, which are each interposed between any two adjoining rollers 6. After completion of loading the rollers 6, the loading bore 8 of the outside race 3 is finally closed with the plug 5, which is then fixedly secured there by means of the locking pin 9 that extends from any one of the axially opposed sides 37 of the outside race 3 to the other through the holes 31, 35.

The production process for the cross-roller bearing 1 with the plug composed of the procedure steps as stated earlier is more profitable to smooth production runs and high-accuracy finishing of the products, compared with the prior production method in which the plug to be applied later to any associated race is prepared separately from the races. Thus, the present invention provides functional merits to work out issues in the prior art and advantages unexpected in the conventional cross-roller bearing with plug.

Figure 8:
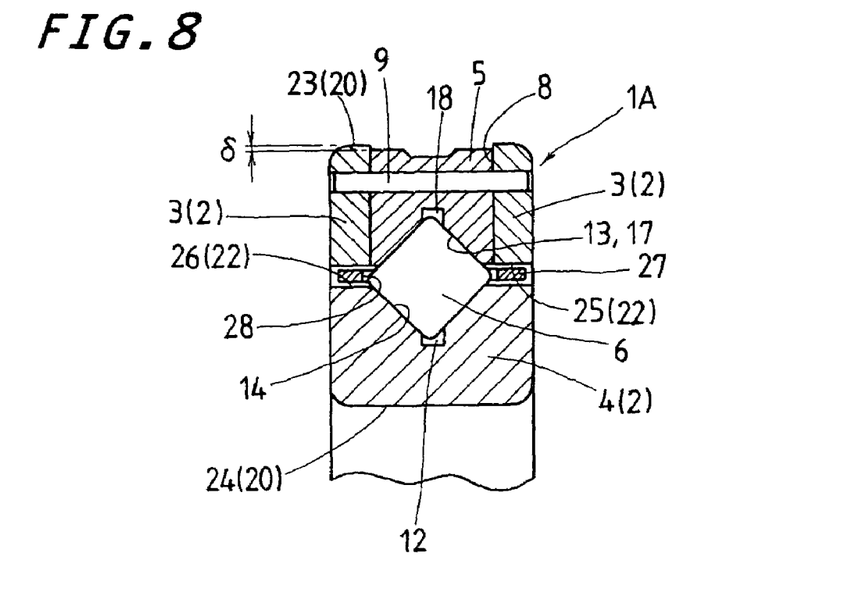
FIG. 8 is a fragmentary view in transverse section showing a second embodiment of the cross-roller bearing with the plug according to the present invention.

Referring next to FIG. 8, there is illustrated a second embodiment of the cross-roller bearing with plug constructed according to the present invention. With the cross-roller bearing 1A of the second embodiment, a retainer 27 made with a pocket 28 to hold the roller 6 therein is interposed between the outside and inside races 3, 4 instead of the separators 7 employed in the first embodiment stated earlier. This second version helps make sure of high-speed rotation adapted to follow any more high-speed operation. The rollers 6 interposed between the raceway surfaces 13, 14 on the outside and inside races 3, 4 of the cross-roller bearing 1A are fit in the pockets 28 in the retainer 27, one to each pocket, and arranged circularly in such a relation that any two adjacent rollers are oppositely inclined with their own axes intersecting alternately one another. In the production process for the cross-roller bearing 1A, only lying the retainer 27 between the outside and inside races 3, 4 is needed at the time when the inside race 4 fits inside the outside race 3 at the final step 10. Then, the rollers 6 are loaded in sequence into the pockets 28 through the loading bore 8.

As a further alternative, there is shown in FIG. 9 a third version of the present invention in which the inside race 4 is made therein with the loading bore 8 and the rollers 6 are inserted on the side of the inside circular surface 24 of the inside race 4 into the space between the confronting raceway grooves 13, 14. This third version is substantially equivalent in performance and advantage with the other versions in which the outside race 3 is provided therein with the loading bore 8, and further can be prepared with the same production process as stated earlier. At least one loading bore 8 is made open circularly around the inside race 4.

While the present invention has been disclosed in connection with the preferred embodiments thereof, it should be understood that other embodiments might be fall within the spirit and scope of the invention, as defined by the following claims.

What is claimed is:

1. A production process for a cross-roller bearing with plug, comprising the steps of;

keeping a plug blank at a predetermined position in a loading bore cut in any one race blank for the ringlike track for introduction of more than one rolling element of roller, rough cutting both the plug blank and the race blank at once and then subjecting them to a hardening treatment;

moving the plug blank towards a biased position where an outside surface of the plug blank rises above an outside circular surface of the race blank, followed by working the outside surface of the plug blank together with the outside circular surface of the race blank at a time into finished surfaces lying in flush with one another;

setting the plug blank back relatively to the race blank from the biased position to its initial position where the outside surface of the plug blank sinks below the outside circular surface of the race blank, followed by working an inside surface of the plug blank together with an inside surface of the race blank at a time, thereby finish cutting any one race combined together with the plug to have a circular raceway surface of V-shape in transverse section extending over both of them;

combining other race of the ringlike track with the one race with no plug so as to fit the races into each other in a way the raceway surfaces on the races come into confronting one another, thereafter inserting more than one roller into a space between the confronting raceway surfaces through the loading bore; and then fitting the plug into the loading bore to secure fixedly the plug to the one race at the determined position.

2. A production process for a cross-roller bearing with plug as defined in claim 1, wherein the step of keeping the plug blank at the predetermined position in the loading bore cut in the one race blank is performed with using a locking pin of straight pin, and the step of moving the plug blank towards the biased position where the plug blank rises above the race blank is carried out with replacing the locking pin for a spring pin, which is in turn forced to get any deformation.

3. A production process for a cross-roller bearing with plug as defined in claim 2 wherein the step of setting the plug blank back from the biased position to its initial position where the outside surface of the plug blank sinks below the outside circular surface of the race blank is carried out by deforming again the already deformed spring pin to restore its initial straight shape to be drawn out of the both the plug blank and the race blank, and then applying a new locking pin instead of the spring pin.

4. A production process for a cross-roller bearing with plug as defined in claim 1, wherein the one race is the outside race while the other race is the inside race, or the one race is the inside race while the other race is the outside race.

5. A production process for a cross-roller bearing with plug as defined in claim 1, wherein the rough cutting is carried out to roughly cut axially opposite sides and the outside circular surface of the race blank, including for the outside surface of the plug blank, and further the rough cutting is done to roughly cut the inside circular surface of the race blank, including for the inside surface of the plug blank, to make the raceway surface of V-shape in transverse section and to cut a circular recess for cutting relief recess into the inside circular surface of the race blank, including for the inside surface of the plug blank.

* * * * *